United States Patent [19]
Yamamoto et al.

[11] Patent Number: 5,742,569
[45] Date of Patent: Apr. 21, 1998

[54] INFORMATION RECORD MEDIUM, APPARATUS FOR RECORDING THE SAME AND APPARATUS FOR REPRODUCING THE SAME

[75] Inventors: Kaoru Yamamoto, Tsurugashima; Hirohide Kobori, Tokorozawa; Takao Sawabe, Tokyo; Junichi Yoshio; Ryuichiro Yoshimura, both of Tokorozawa; Yoshiaki Moriyama; Akihiro Tozaki, both of Tusurgashima, all of Japan

[73] Assignee: Pioneer Electronic Corporation, Tokyo, Japan

[21] Appl. No.: 821,920

[22] Filed: Mar. 21, 1997

[30] Foreign Application Priority Data

Mar. 22, 1996 [JP] Japan ................................. 8-066404

[51] Int. Cl.$^6$ .................................................. G11B 7/00
[52] U.S. Cl. .................................. 369/32; 369/275.3
[58] Field of Search ............................ 369/47, 32, 48, 369/124, 53, 275.3

[56] References Cited

U.S. PATENT DOCUMENTS

| | | | |
|---|---|---|---|
| 5,467,326 | 11/1995 | Miyashita et al. | 369/34 |
| 5,592,450 | 1/1997 | Yonemitsu et al. | 369/48 |
| 5,594,709 | 1/1997 | Nagano et al. | 369/32 |
| 5,611,693 | 3/1997 | Chaya et al. | 369/34 |
| 5,636,186 | 6/1997 | Yamamoto et al. | 369/49 |

*Primary Examiner*—Nabil Hindi
*Attorney, Agent, or Firm*—Morgan, Lewis & Bockius LLP

[57] ABSTRACT

An information recording apparatus is provided with a signal process device for generating and outputting content information including (i) identification information to identify each of partial record informations constructing whole record information to be recorded onto an information record medium and to indicate content of each of the partial record informations, and (ii) start position information indicating a start position on the information record medium of each of the partial record informations corresponding to the identification information, on the basis of control information inputted from the external to control a reproduction of the record information. The information recording apparatus is also provided with: a multiplex device for multiplexing the record information and the content information, to thereby generate and output multiplexed record information; and a record device for recording the multiplexed record information onto the information record medium.

13 Claims, 12 Drawing Sheets

FRAME PICTURES OF GOP

STRUCTURE OF INTERLEAVED UNIT

IU : INTERLEAVED UNIT

STRUCTURE OF PGCI

FIG. 7A

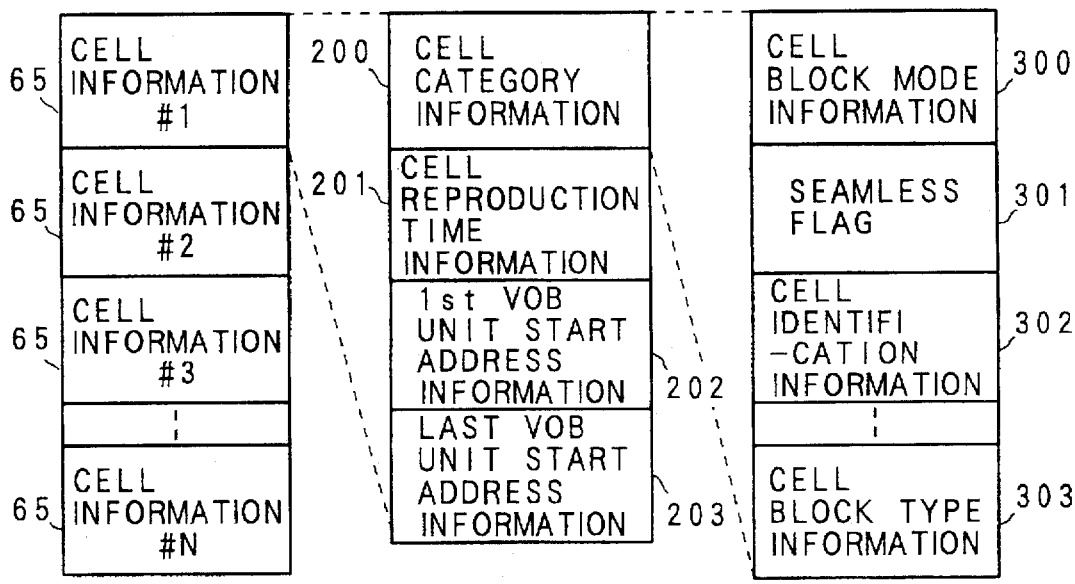

FIG. 7B

302: CELL IDENTIFICATION INFORMATION

| CELL | CONTENT | CELL | CONTENT |
|---|---|---|---|
| CELL20A | CREDIT | CELL20K | INTERLUDE |
| CELL20B | INTRODUCTION | CELL20L | CHORUS MALE |
| CELL20C | CHORUS MALE | CELL20M | CHORUS FEMALE |
| CELL20D | CHORUS FEMALE | CELL20N | INTERLUDE |
| CELL20E | PATINATION MALE | CELL20O | CHORUS MALE |
| CELL20F | PATINATION FEMALE | CELL20P | CHORUS FEMALE |
| CELL20G | CHORUS MALE | CELL20Q | ENDING |
| CELL20H | CHORUS FEMALE | | |
| CELL20I | CHORUS MALE+FEMALE | | |
| CELL20J | CHORUS FEMALE | | |

FIG. 8A

| CELL IDENTIFI-CATION INFOR-MATION | CONTENT |
|---|---|
| 00h | PROHIBIT |
| 01h | CREDIT |
| 02h | INTRODUCTION |
| 03h | CHORUS (OTHER THAN PATINATION) |
| 04h | PATINATION 1 |
| 05h | PATINATION 2 |
| 06h | CHORUS MALE |
| 07h | CHORUS FEMALE |
| 08h | CHORUS MALE+FEMALE |
| 09h | INTERLUDE |
| 0Ah | FADE IN |
| 0Bh | FADE OUT |
| 0Ch | ENDING 1 |
| 0Dh | ENDING 2 |

FIG. 8B

| CELL IDENTIFI-CATION INFOR-MATION | CONTENT |
|---|---|
| 00h | PROHIBIT |
| 01h | CREDIT |
| 02h | INTRODUCTION |
| 03h | CHORUS (OTHER THAN PATINATION) |
| 04h | CHORUS MALE A |
| 05h | CHORUS MALE B |
| 06h | CHORUS FEMALE A |
| 07h | CHORUS FEMALE B |
| 08h | CHORUS MALE+FEMALE |
| 09h | PATINATION 1 |
| 0Ah | PATINATION 2 |
| 0Bh | PATINATION MALE A |
| 0Ch | PATINATION MALE B |
| 0Dh | PATINATION FEMALE A |
| 0Eh | PATINATION FEMALE B |
| 0Fh | PATINATION MALE+FEMALE |
| 10h | INTERLUDE |
| 11h | FADE IN |
| 12h | FADE OUT |
| 13h | ENDING 1 |
| 14h | ENDING 2 |

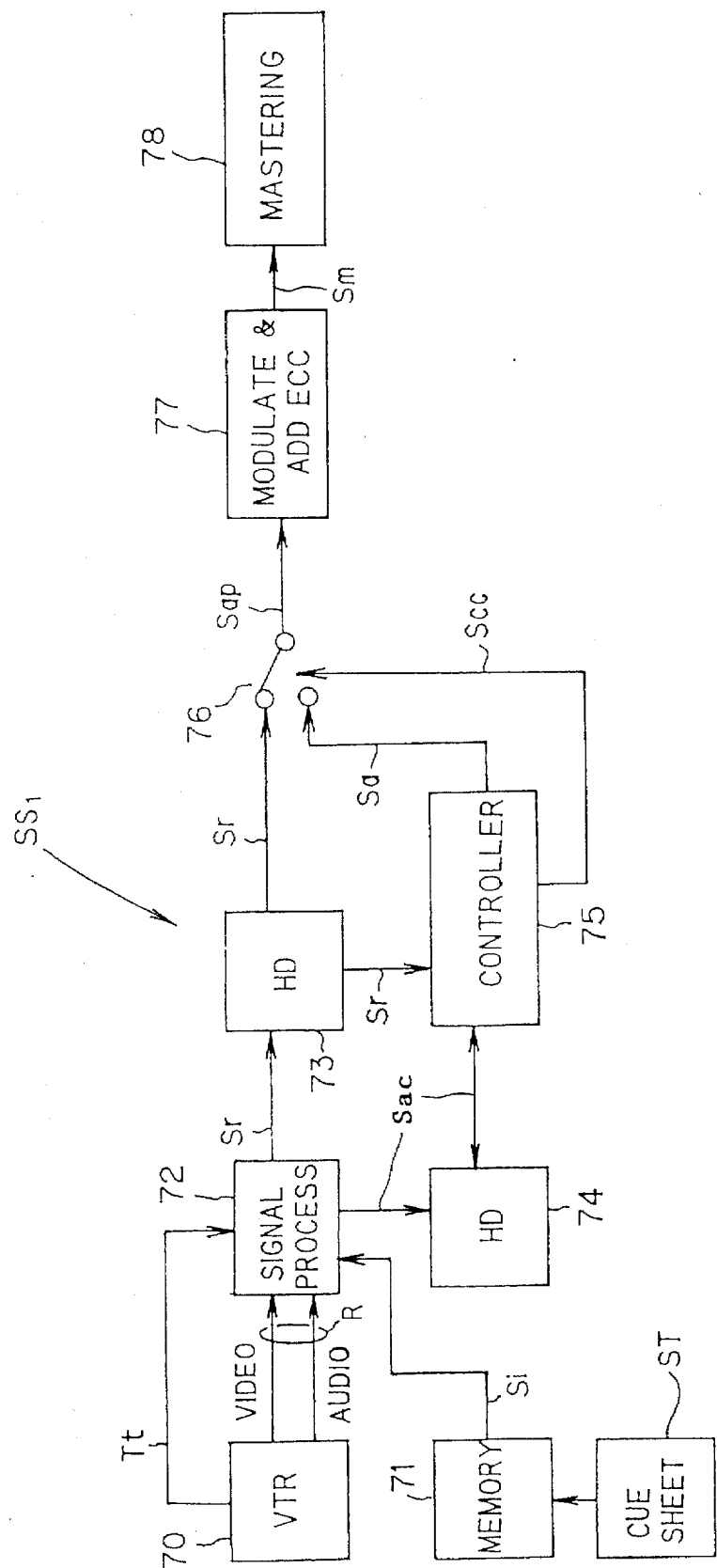

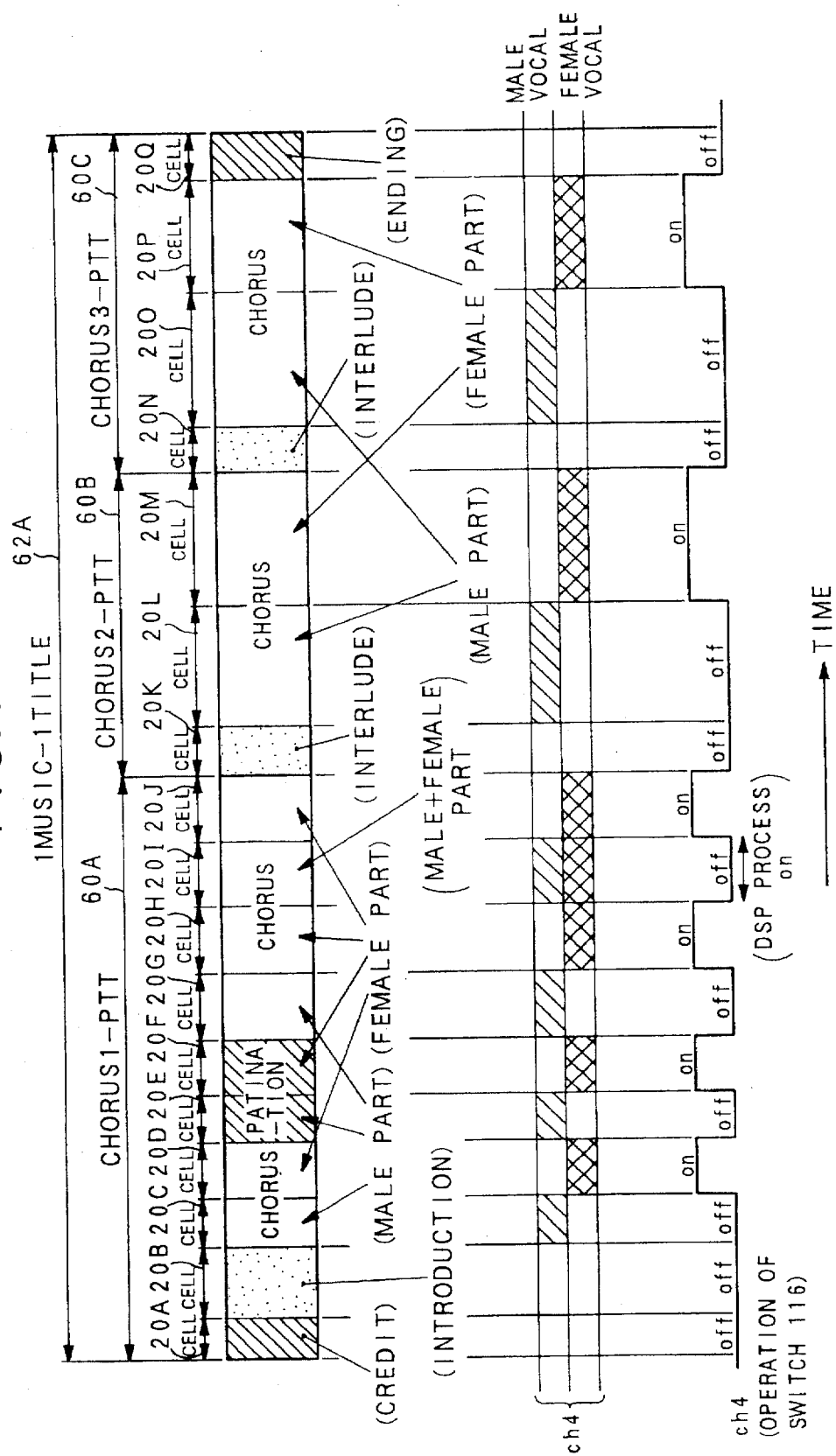

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, in the above mentioned LD or the like, there is a problem that an audience cannot perform a variegated reproduction in such a manner that the audience has options as for the video picture to be displayed or the audio voice to be reproduced, and then selects and views desirable one of them.

That is, for example, in a case of enjoying so-called KARAOKE (i.e. one kind of music accompaniment playing) or the like while reproducing the KARAOKE accompaniment song recorded on the LD, when the KARAOKE accompaniment song is a duet song and there are a male singing part and a female singing part in that song, it is not possible to separate and reproduce only the female singing part so as to allow the male, who enjoys the KARAOKE, to enjoy the duet with the reproduced female singing part.

On the other hand, various proposals and developments as for the DVD, which is an optical disk having a memory capacity about ten times as much as that of the conventional CD without changing the size of the optical disk itself, are energetically being made nowadays. However, a method of recording the record information onto this DVD is not proposed and developed in which only the female singing part (or the male singing part) can be separated or extracted in the above explained manner. Further, in the technical art of the DVD, the actuality is such that a person having an ordinary skill in this art does not even recognize a subject itself to reproduce only one part of the record information.

SUMMARY OF THE INVENTION

It is therefore an object of the present invention to provide: an information recording apparatus, which can record the record information so as to enable the variegated reproduction by reproducing only a portion of a series of the record information independently on an axis of reproduction time thereof; an information recording medium on which the information is recorded by the information recording apparatus; and an information reproducing apparatus, which can reproduce only the portion of the record information independently on the axis of reproduction time.

The above object of the present invention can be achieved by an information recording apparatus provided with: a signal process device for generating and outputting content information, such as cell reproduction information (described alter) etc., including (i) identification information, such as cell identification information (described later) etc., to identify each of partial record informations, such as cells (described later) etc., constructing whole record information to be recorded onto an information record medium, such as the DVD etc., and to indicate content of each of the partial record informations, and (ii) start position information, such as address information etc., indicating a start position on the information record medium of each of the partial record informations corresponding to the identification information, on the basis of control information inputted from the external to control a reproduction of the record information; a multiplex device, such as a controller, a multiplexer etc., for multiplexing the record information and the content information, to thereby generate and output multiplexed record information; and a record device, such as a mastering device etc., for recording the multiplexed record information onto the information record medium.

According to the information recording apparatus of the present invention, at first, the content information including the identification information and the start position information is generated and outputted on the basis of the control information inputted from the external to control the reproduction of the record information, by the signal process device. Here, the identification information identifies each of partial record informations, and also indicates the content of each of the partial record informations. The start position information indicates the start position on the information record medium of each of the partial record informations corresponding to the identification information. Then, the record information and the content information are multiplexed, so that the multiplexed record information is generated and outputted, by the multiplex device. Finally, the multiplexed record information is recorded onto the information record medium, by the record device.

Therefore, at the time of reproducing the record information, by specifying the partial record information having the content to be reproduced, it is possible to detect and reproduce only the partial record information having the specified content, by referring to the content information which can be reproduced from the information record medium.

Accordingly, since the reproduction can be performed by specifying the content for each of the partial record informations, it is possible to perform the variegated reproduction.

In one aspect of the information recording apparatus of the present invention, the record information comprises a plurality of channels to be reproduced at reproduction times same to each other. And that, the signal process device generates the content information including the identification information comprising information to indicate each of the partial record informations, which constitutes at least one channel of the channels.

According to this aspect, since each of the partial record informations, which constitutes some channels, is indicated by the identification information, it is possible at the time of reproducing the record information to detect only the partial record information specified as for the necessary channels. As for other channels, the reproduction can be performed continuously.

In another aspect of the information recording apparatus of the present invention, the record information comprises audio information including a song. And that, the signal process device generates the content information including the identification information comprising information to identify any one of the partial record information corresponding to the song sung only by a male, the partial record information corresponding to the song sung only by a female and the partial record information corresponding to the song sung by both of the male and the female.

According to this aspect, at the time of reproducing the record information, it is possible to select arbitrary one song among the song sung only by the male, the song sung only by the female and the song sung by both of the male and the female, to thereby produce only the selected song.

In another aspect of the information recording apparatus of the present invention, the record information comprises music information, which content is constituted by music of at least one music instrument. And that, the signal process device generates the content information including the identification information comprising information to identify the kind of music instrument which mainly constitutes content of the music information in each of the partial record informations.

According to this aspect, at the time of reproducing the record information, it is possible to select only the music instrument to be desirably reproduced, to thereby reproduce the record information corresponding to the selected music instrument.

The above object of the present invention can be also achieved by an information record medium, such as the DVD etc., recorded with record information to be reproduced by an information reproducing apparatus for reproducing the record information on the basis of content information recorded on the information record medium besides the record information. The information record medium comprises a data structure stored in the information record medium and including: the record information; and the content information, such as the cell reproduction information etc., including (i) identification information, such as the cell identification information etc., to identify each of partial record informations, such as the cell etc., constructing the record information to be recorded onto an information record medium and to indicate content of each of the partial record informations, and (ii) start position information, such as the address information etc., indicating a start position on the information record medium of each of the partial record informations corresponding to the identification information, on the basis of control information inputted from the external to control a reproduction of the record information. The record information and the content information are multiplexed and recorded as multiplexed record information on the information record medium.

According to the information record medium of the present invention, the record information and the content information, which includes the identification information and the start position information, are multiplexed and recorded as the multiplexed record information on the information record medium. Therefore, at the time of reproducing the record information, by specifying the partial record information having the content to be reproduced, it is possible to detect and reproduce only the partial record information having the specified content, by referring to the content information which can be reproduced from the information record medium.

Accordingly, since the reproduction can be performed by specifying the content for each of the partial record informations, it is possible to perform the variegated reproduction.

In one aspect of the information record medium of the present invention, the record information comprises a plurality of channels to be reproduced at reproduction times same to each other. And that, the identification information comprises information to indicate each of the partial record informations, which constitutes at least one channel of the channels.

According to this aspect, since each of the partial record informations, which constitutes some channels, is indicated by the identification information, it is possible at the time of reproducing the record information to detect only the partial record information specified as for the necessary channels. As for other channels, the reproduction can be performed continuously.

In another aspect of the information record medium of the present invention, the record information comprises audio information including a song. And that, the identification information comprises information to identify any one of the partial record information corresponding to the song sung only by a male, the partial record information corresponding to the song sung only by a female and the partial record information corresponding to the song sung by both of the male and the female.

According to this aspect, at the time of reproducing the record information, it is possible to select arbitrary one song among the song sung only by the male, the song sung only by the female and the song sung by both of the male and the female, to thereby produce only the selected song.

In another aspect of the information record medium of the present invention, the record information comprises music information, which content is constituted by music of at least one music instrument. And that, the identification information comprises information to identify the kind of music instrument which mainly constitutes content of the music information in each of the partial record informations.

According to this aspect, at the time of reproducing the record information, it is possible to select only the music instrument to be desirably reproduced, to thereby reproduce the record information corresponding to the selected music instrument.

The above object of the present invention can be also achieved by an information reproducing apparatus for reproducing record information from the above described information record medium of the present invention. The information reproducing apparatus is provided with: a detection device, such as an optical pickup, a demodulation and correct unit etc., for detecting the multiplexed record information from the information record medium; an extract device, such as a system buffer etc., for extracting the content information from the detected multiplexed record information; a specification device, such as an input unit etc., for outputting a specifying signal to specify the content of one partial record information to be reproduced, among the partial record informations; a switch device for switching to transmit therethrough or stop thereat an output of the record information to the external after the content information is extracted; and a control device, such as a system controller etc., for controlling the switch device to transmit therethrough only the one partial record information having the content specified by the specifying signal to the external, on the basis of the outputted specifying signal and the extracted content information.

According to the information reproducing apparatus of the present invention, at first, the multiplexed record information is detected from the information record medium by the detection device. Then, the content information is extracted from the detected multiplexed record information, by the extract device. Meanwhile, the specifying signal to specify the content of one partial record information to be reproduced, among the partial record informations, is outputted from the specification device. Then, after the content information is extracted, it is switched to transmit therethrough or stop thereat the output of the record information to the external, by the switch device. At this time, under the control of the control device, the switch device is controlled to transmit therethrough only the one partial record information having the content specified by the specifying signal to the external, on the basis of the outputted specifying signal and the extracted content information.

Therefore, by specifying the content to be reproduced, it is possible to detect and reproduce only the partial record information having the specified content on the basis of the content information which can be reproduced from the information record medium.

Accordingly, since the reproduction can be performed by specifying the content for each of the partial record informations, it is possible to perform the variegated reproduction.

In one aspect of the information reproducing apparatus of the present invention, the record information comprises a plurality of channels to be reproduced at reproduction times same to each other. And that, the extract device extracts the content information including the identification information comprising information to indicate each of the partial record informations, which constitutes at least one channel of the channels.

According to this aspect, since each of the partial record informations, which constitutes some channels, is indicated by the identification information, it is possible to detect only the partial record information specified as for the necessary channels. As for other channels, the reproduction can be performed continuously.

In another aspect of the information reproducing apparatus of the present invention, the record information comprises audio information including a song. And that, the extract device extracts the content information including the identification information comprising information to identify any one of the partial record information corresponding to the song sung only by a male, the partial record information corresponding to the song sung only by a female and the partial record information corresponding to the song sung by both of the male and the female.

According to this aspect, it is possible to select arbitrary one song among the song sung only by the male, the song sung only by the female and the song sung by both of the male and the female, to thereby produce only the selected song.

In this aspect, it is preferable that the information reproducing apparatus is further provided with: an output device, such as a microphone etc., for outputting an external voice signal corresponding to an external voice inputted from the external at a same time of the reproduction of the record information; and a convert and output device, such as a DSP (Digital Signal Processor) etc., for converting the outputted external voice signal in correspondence with the external voice without reproducing partial record information corresponding to a song sung by both of a male and a female, to thereby generate and output a male song and a female song, on the basis of the content specified by the specification device, at a reproduction time when the partial record information corresponding to the song sung by both of the male and the female is reproduced.

According to this case, the external voice signal corresponding to the external voice inputted from the external at a same time of the reproduction of the record information is outputted by the output device. At this time, the outputted external voice signal is converted in correspondence with the external voice without reproducing partial record information corresponding to a song sung by both of a male and a female, by the convert and output device. Then, at the reproduction time when the partial record information corresponding to the song sung by both of the male and the female is reproduced, the male song and the female song are generated and outputted by the convert and output device, on the basis of the content specified by the specification device.

Accordingly, at the reproduction time when the partial record information corresponding to a song to be sung by both of the male and female is reproduced, if the external voice is inputted by the male for example, the male voice inputted from the external and the female voice to which the male voice is converted can be outputted as if the actual male voice and the generated female voice were in singing the duet song.

In another aspect of the information reproducing apparatus of the present invention, the record information comprises music information, which content is constituted by music of at least one music instrument. And that, the extract device extracts the content information including the identification information comprising information to identify the kind of music instrument which mainly constitutes content of the music information in each of the partial record informations.

According to this aspect, it is possible to select only the music instrument to be desirably reproduced, to thereby reproduce the record information corresponding to the selected music instrument.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7A is a diagram showing a structure of cell information as one detailed structure of the PGCI in the embodiment;

FIG. 7B is a table showing a structure of cell identification information as another detailed structure of the FGCI in the embodiment;

FIGS. 8A and 8B are tables showing an example of classification of numeral data described as the cell identification information in the embodiment;

FIG. 9 is a block diagram of an information recording apparatus as one embodiment of the present invention;

FIG. 12 is a diagram showing an operation of the KARAOKE apparatus of the embodiment at the time of performing a KARAOKE performance.

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

partial record information: cell identification information: cell identification information start position information: address information content information: cell reproduction information (I) Embodiment of Information Record Medium First of all, a physical structure and a logical structure as well as an operation of a DVD, as one embodiment of the information record medium to which the present invention is applied, will be explained with reference to FIGS. 1 to 8B. In the embodiments described hereinbelow, the explanations will be made as for a case where the video information and the audio information (including the musical information) for the KARAOKE are recorded with respect to the DVD. In this case, the video information indicates the video information to be displayed as a background video image for the KARAOKE. It is assumed that the KARAOKE recorded on the DVD in the present embodiment is not only a music accompaniment but also a vocal in harmonization with the appropriate music accompaniment.

Figure 1:
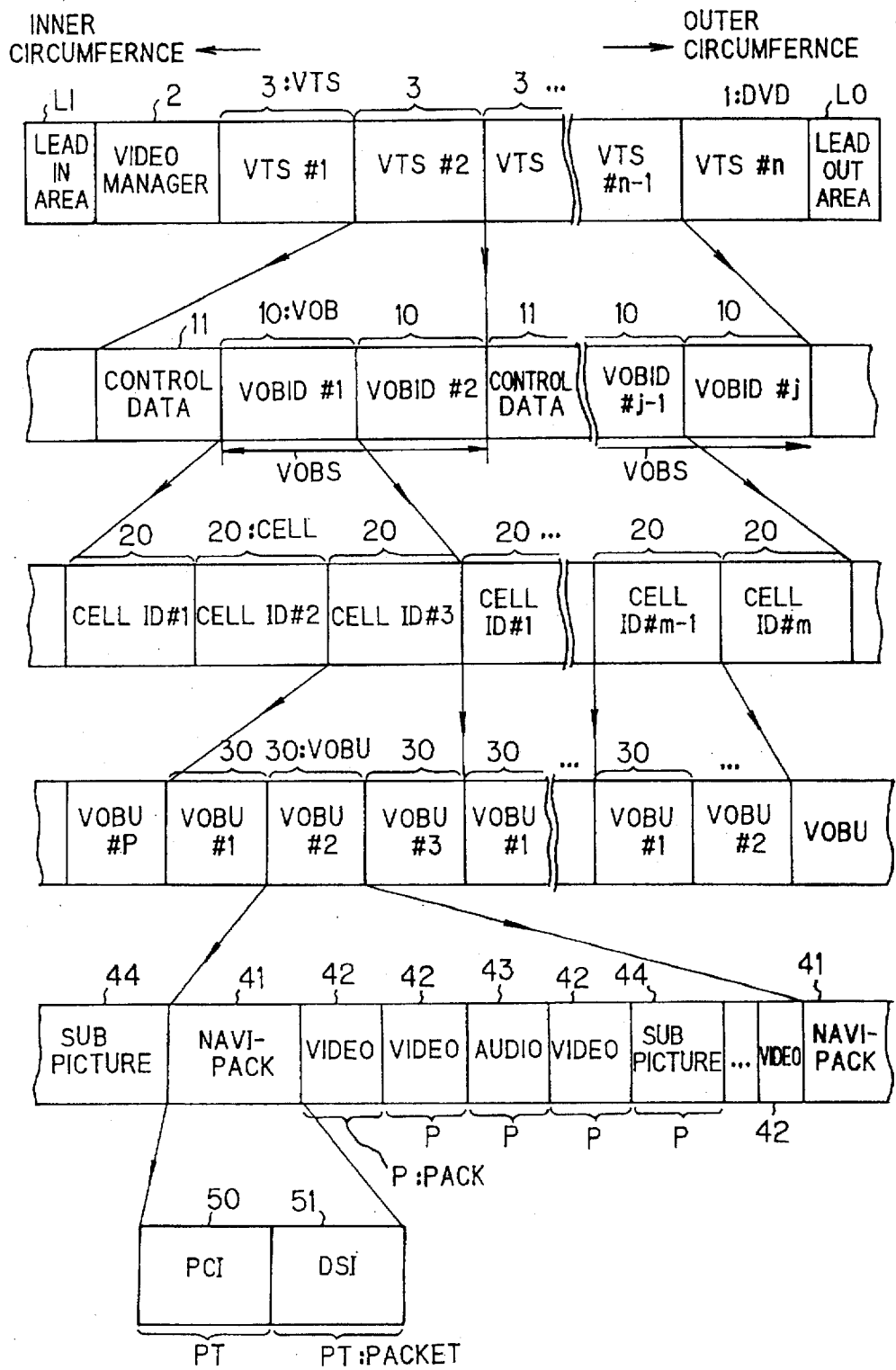
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work corresponding to one music which an author or producer intends to offer to the audience, in case of the KARAOKE), which are related to each other (e.g., which attribute, such as the number, the specification, the corresponding languages etc. of the audio information and sub picture information included therein, is the same to each other). More concretely, in case of the KARAOKE, musics classified in a popular music genre may be recorded as different titles respectively to constitute one VTS as the "Popular Music". Then, different genres of the KARAOKE (e.g., a popular music genre, a ballads music genre, a war song genre) may be recorded to constitute different VTSs respectively.

Further, ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2 . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2 . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2 . . . ). Here, the VOB unit 30 is an information unit, each of which includes at least one of the video information, the audio information and sub picture information (which is defined as information of a sub picture such as characters to display lyrics for the KARAOKE etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture (e.g. lyrics for the KARAOKE), is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. These video data 42, audio data 43 and sub picture data 44 are not collectively recorded respectively, but are divided into a plurality of pieces and are recorded in each VOB unit 30 respectively.

It is prescribed by a standard specification of the DVD that there are 8 kinds of audio recordable on the DVD 1 while 32 kinds of sub picture recordable on the DVD 1. Further, these 8 kinds of audio informations are recorded such that each kind constitutes respective one of the continuous streams independent from each other.

For example, a case is explained where the audio information for the KARAOKE is recorded on the DVD 1. In this case, the audio information corresponding to the above mentioned one stream is recorded while including a plurality of channels. For example, the music information constituted by the accompaniment music to be outputted from a left speaker is recorded on a $1^{st}$ channel. Music information constituted by the accompaniment music to be outputted from a right speaker is recorded on a $2^{nd}$ channel. Guide melody (i.e. the accompaniment sounds constituted by the melody to be sung by a user enjoying the KARAOKE) is recorded on a $3^{rd}$ channel. Vocal (i.e. the lyric corresponding to the KARAOKE) itself is recorded on a $4^{th}$ channel. At this time, if the KARAOKE to be recorded is the duet song sung by the male and the female, both of the song sung by the male and the song sung by the female are recorded as the same $4^{th}$ channel.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
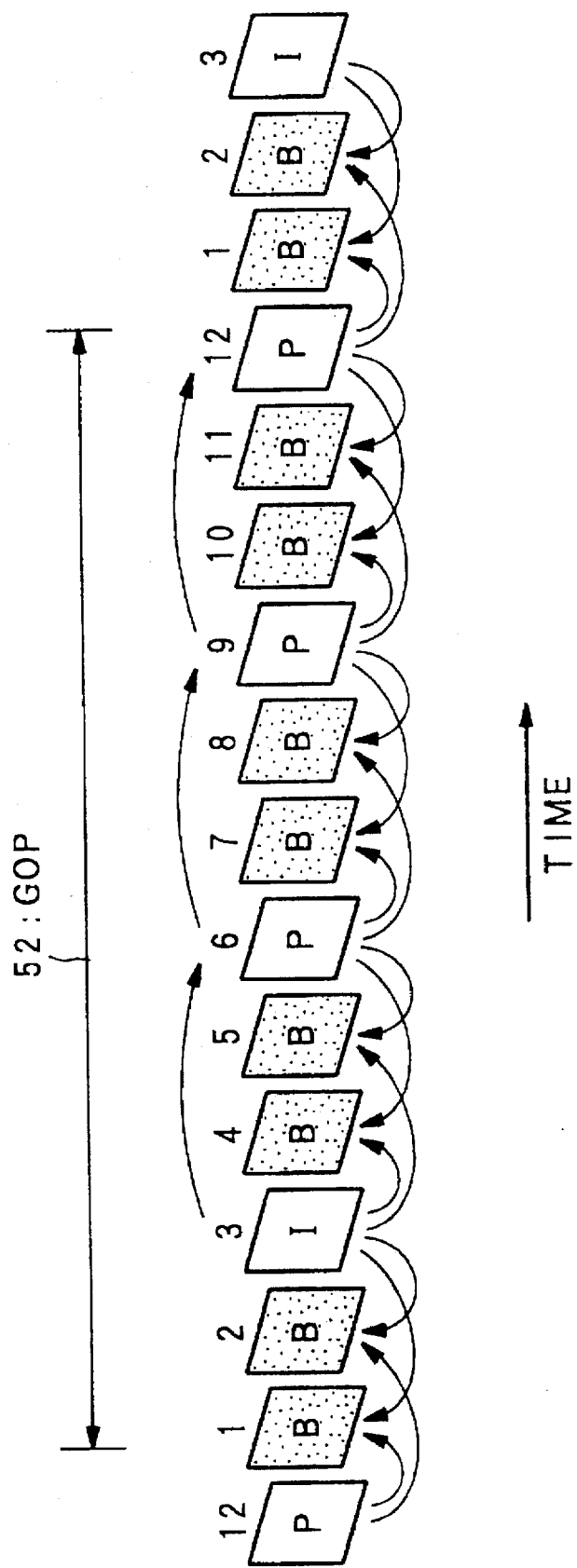
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Figure 3:
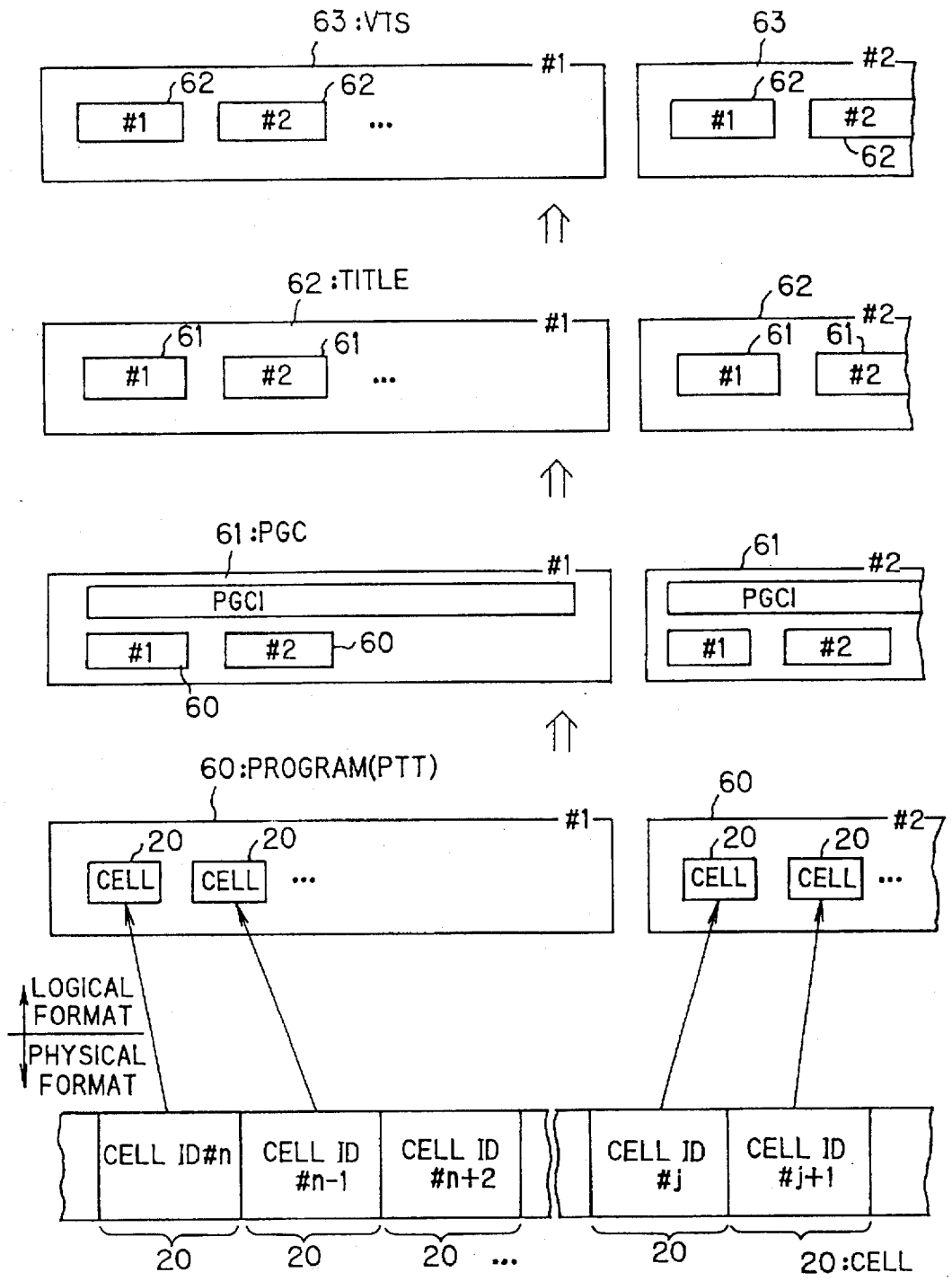
FIG. 3 is a diagram showing a logical structure of the record information of the DVD in FIG. 1.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIGS. 1 to 3 by combining them (especially combining the cells 20) in the logical structure shown in FIG. 3, is recorded on the DVD 1, especially in the control data 11.

To make the explanation clear, the following explanation is made from the lower hierarchical layer in FIG. 8. One program 60 is logically constructed to be displayed as the KARAOKE to the audience on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (Part of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2 . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; cell identification information of each cell 20 as a feature of the present embodiment and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2 . . . ) as shown in FIG. 8. The title 62 is, for example, a unit corresponding to one KARAOKE music as aforementioned, and is completed information which the author would like to offer to the audience of the DVD 1.

Finally, one VTS 63 is logically constructed of one or a plurality of titles 62 (title #1, title #2 . . . ) as shown in FIG. 3. The title 62 included in the VTS 63 has the attributes common to each other. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the background image) for the audience to watch and the audio sounds etc., are to be formed.

Now, a logical format of the KARAOKE audio information (i.e. the audio data 43) explained in this embodiment is more concretely explained with reference to FIG. 4. The logical format shown in FIG. 4 shows an example of a logical format for the 4$^{th}$ channel, on which the vocal itself including both of the male voice and the female voice is recorded among the four channels constituting the aforementioned one voice stream.

Figure 4:
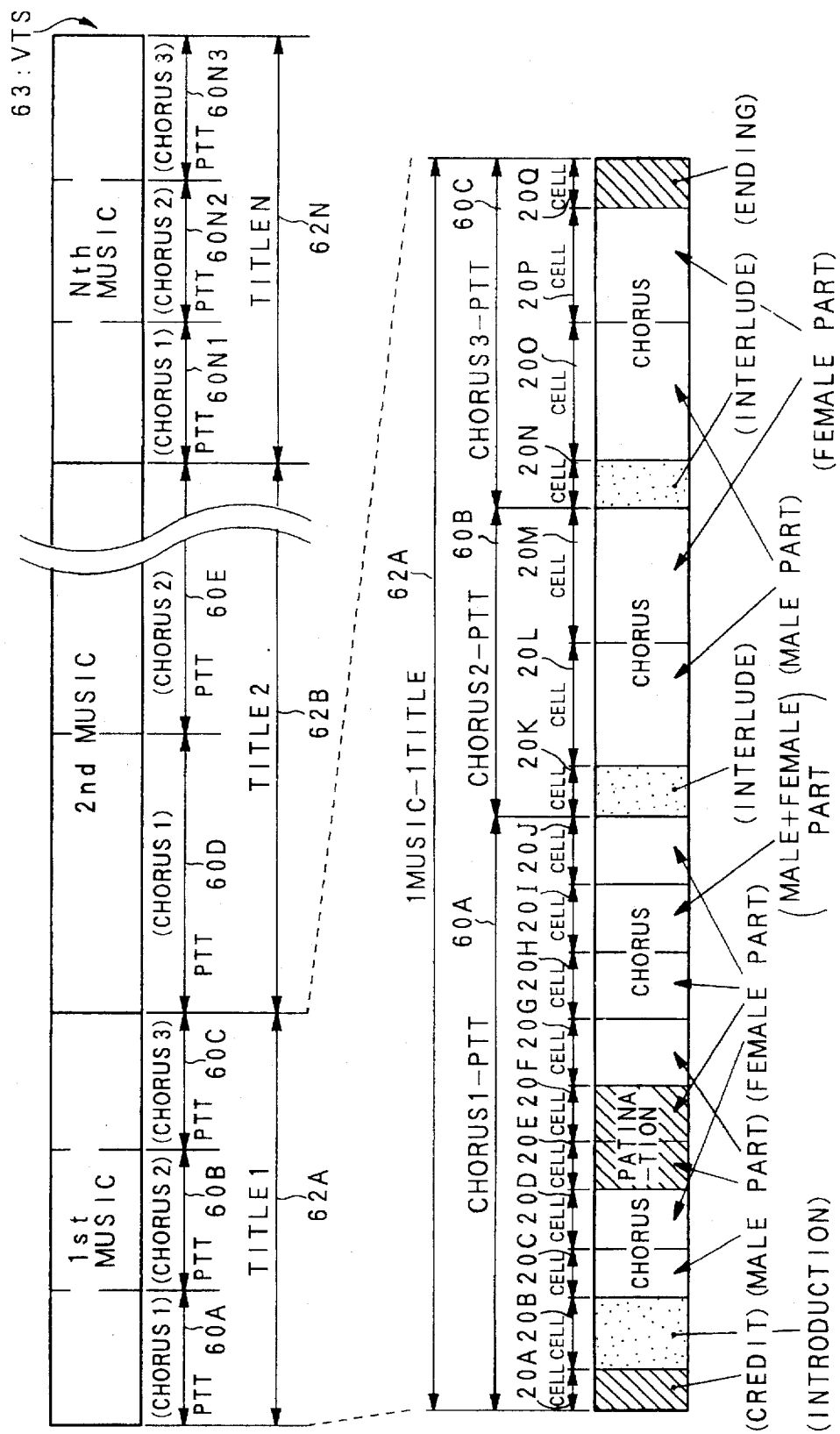
FIG. 4 is a diagram showing a logical structure (logical format) in case of constructing KARAOKE music in the embodiment.

As shown in an upper stage of FIG. 4, in a case of recording the KARAOKE audio information on the DVD 1, one VTS 63 is composed of titles 62A, 62B . . . 62N each of which corresponds to respective one of musics of the KARAOKE. Each of the titles 62A, 62B . . . 62N is composed of a plurality of PTTs 60 each of which corresponds to respective one of choruses of the KARAOKE (corresponding to a first chorus, a second chorus . . . in one music). In the example shown in FIG. 4, the title 62A is composed of a PTT 60A (chorus 1), a PTT 60B (chorus 2) and a PTT 60C (chorus 3), and the title 62N is composed of a PTT 60N1 (chorus 1), a PTT 60N2 (chorus 2) and a PTT 60N3 (chorus 3).

Next, the cell 20 constituting each PTT 60 is explained for a case where the KARAOKE shown in FIG. 4 is a duet song for the male and the female, with the PTT 60A (chorus 1) within the title 62A corresponding to one music as an example. In this case, each PTT 60 is composed of a plurality of cells 20 (refer to FIG. 3). In each of the cells 20, a boundary is set on the basis of the content of the audio information included in each of the cells 20. The contents of the audio informations included in the respective cells 20 are different from each other.

That is, as shown in a lower stage of FIG. 4, the PTT 60A (chorus 1) is composed of 10 cells 20A to 20J. The contents of the audio informations included in the respective cells 20 are as following. Namely, the cell 20A is composed of music information corresponding to a credit (i.e. the music to be played at a start of a song irrespective of the content of the song). The cell 20B is composed of music information of an introduction portion. The cell 20C is composed of audio information corresponding to a song (chorus) only for the male. The cell 20D is composed of audio information corresponding to a song (chorus) only for the female. The cell 20E is composed of audio information corresponding to the patination to be sung by the male. The cell 20F is composed of audio information corresponding to the patination to be sung by the female. The cell 20G is composed of audio information corresponding to a song only for the male. The cell 20H is composed of audio information corresponding to a song only for the female. The cell 20I is composed of audio information corresponding to a song to be sung simultaneously by the male and the female. And, the cell 20J is composed of audio information corresponding to a song only for the female.

The PTT 60B (chorus 2) is composed of three cells 20K to 20M. The contents of audio informations included in the respective cells 20 are as following. Namely, the cell 20K is composed of music information corresponding to an interlude. The cell 20L is composed of audio information corresponding to a song only for the male. And, the cell 20M is composed of audio information corresponding to a song only for the female.

Moreover, the PTT 60C (chorus 3) is composed of four cells 20N to 20Q. The contents of audio informations included in the respective cells 20 are as following. Namely, the cell 20N is composed of music information corresponding to an interlude. The cell 20O is composed of audio information corresponding to a song only for the male. The cell 20P is composed of audio information corresponding to a song only for the female. And, the cell 20Q is composed of music information corresponding to an ending.

In this manner, the audio information in the DVD 1 of this embodiment is composed of the cells 20 which contents of the audio informations, in which the respective PTTs 60 are included, are different from each other. The cell identification information to identify the content different for each of the cells 20 at a time of reproduction is recorded within the PGCI 64. This cell identification information is described later in detail.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 5.

Figure 5:
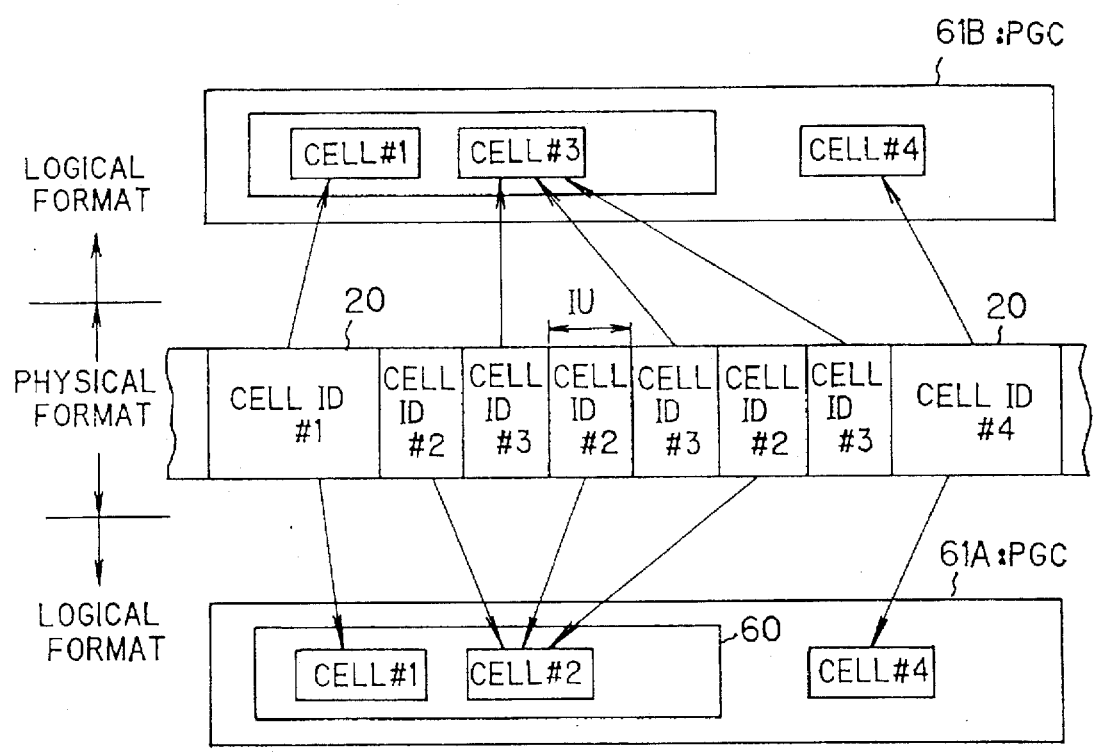
FIG. 5 is a diagram showing a structure of an interleaved unit of the DVD in FIG. 1.

Namely, as shown in FIG. 5, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 5, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

The structure of the cell identification information as a feature of the present embodiment and the PGCI 64, in which the cell identification information is included, are explained with reference to FIGS. 6 to 8.

At first, the structure of the PGCI 64 is explained with reference to FIG. 6.

Figure 6:
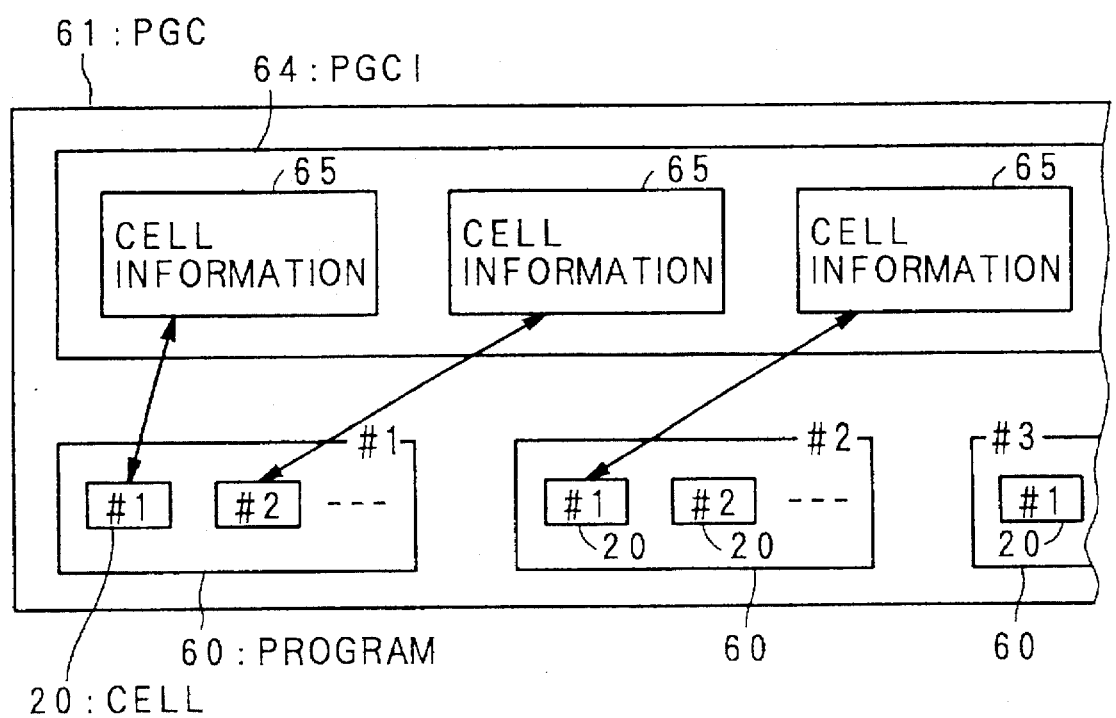
FIG. 6 is a diagram showing a detailed structure of PGCI in the embodiment.

As shown in FIG. 6, the PGCI 64 contains cell information 65 to control the reproduction of each cell 20 included in the program 60 corresponding to each control information contained in the pertinent PGCI 64, by a number corresponding to the number of the cells 20 included in the PGC 61.

The cell information 65 is explained in detail with reference to FIGS. 7A to 7B. As shown in FIG. 7A, each of the cell information 65 corresponding to respective one of the cells 20 is composed of: a cell category information 200 indicative of an attribute of the cell 20 corresponding to the pertinent cell information 65; a cell reproduction time information 201 indicative of a necessary reproduction time in a case of reproducing the audio information included in the pertinent cell 20; a 1$^{st}$ VOB unit start address information 202 indicative of a record start position on the DVD 1 of a first VOB unit 30 included in the pertinent cell 20; and a last VOB unit start address information 203 indicative of a record start position on the DVD 1 of a last VOB unit 30 included in the pertinent cell 20.

One cell category information 200 is composed of: a cell block mode information 300 indicating whether or not the pertinent cell 20 is included within a block composed of a plurality of cells 20 as the occasion demands; a seamless flag 301 which is a flag indicating whether or not the pertinent cell 20 is intended to perform the above mentioned seamless reproduction; a cell identification information 302 indicative of a type of the audio information included in the pertinent cell 20; and a block type information 302 indicative of a type of the block in which the pertinent cell 20 is included. In this example, only one identification information indicative of a content type of the audio information included in one cell 20 is described in one cell identification information 302. Alternatively, the cell identification information 302 may be constructed as shown in FIG. ? B, in which the cell identification informations corresponding to all the cells 20 included in the KARAOKE music indicated in the lower stage of FIG. 4 are collectively described, among all the cells 20 to which PGCI 64 shown in FIG. 7A corresponds. In FIG. 7B, the contents of the cell identification information 302 are indicated in correspondence with the KARAOKE music indicated in the lower stage of FIG. 4.

What is actually recorded as the cell identification information 302 is numeral data, which value is different for each content of the cell 20. Then, FIG. 8A shows an actual example of this numeral data on the basis of the KARAOKE music shown in the lower stage of FIG. 4. In FIG. 8A, "h" indicates that the numeral data is represented in a hexadecimal. Moreover, it is possible that the cell identification information 302 can be described in the PGCI 84 on the basis of a type classification as shown in FIG. 8B, by more finely classifying the cell identification information 802 shown in FIG. 8A. Incidentally, the classification shown in FIG. 8B indicates a case as following. Namely, as for a part sung by only the male or a part sung by only the female, in case that each part is sung by a plurality of males (a male A and a male B) or sung by a plurality of females (a female A and a female B), the part sung by only the males or the part sung by only the females is further divided into a part sung by only one male or only one female, and then each divided part is constituted by one cell 20.

By recording the above explained cell identification information 302 within the PGCI 64 which is located at a position different from the substantial portion of the video information and the audio information, it is possible to reproduce only the cell 20, which the user of the KARAOKE wants to reproduce by an operation of the later described reproducing apparatus by use of the cell identification information 302, at a time of reproduction.

In the above explained embodiment of the DVD 1, the case is explained where the information recorded on the DVD 1 is the KARAOKE music. However, the present invention is not limited thereto. For example, it may be constructed to classify or divide the music, which is constituted only by plays of musical instruments, on the basis of the music instrument which is mainly playing (i.e. playing as so-called "solo"), to thereby constitute the whole music composed of the cells 20 divided for each musical instrument.

(II) Embodiment of Recording Apparatus

Next, an embodiment of recording apparatus for recording the above mentioned control information, video information and audio information for use in the KARAOKE onto the DVD 1 will be explained with reference to FIG. 9.

At first, a construction and an operation of the recording apparatus as the embodiment is explained with reference to FIG. 9.

As shown in FIG. 9, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. for use in the KARAOKE to be recorded on the DVD 1 (which includes the above mentioned video data 42, sub picture data 44 and audio data 43), is temporarily recorded in the VTR 70. Then, the record information R temporarily record in the VTR 70 is outputted to the signal process unit 72 by a request from the signal process unit The signal process unit 72 applies an A/D (Analog to Digital) converting process and a signal compressing process by the MPEG 2 method to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into the cells 20 on the physical structure shown in FIG. 1, in advance, and temporarily stores various control informations which are inputted beforehand on the basis of a cue sheet ST, on which additional informations, such as various control informations including the PGCI 64 constituted of the cell identification information 802 for each of the cells 20 as shown in FIGS. 7A and 7B, (e.g. the video manager 2, the control data 11 including the PGCI 64, the navi-pack 41 (the PCI data 50 and the DSI data 51) and so on, in FIG. 1) are written. Then, the memory 71 outputs it as a control information signal Si on the basis of a request from the signal process unit 72.

Then, the signal process unit 72 generates and outputs a reproduction control information signal Sac, which constituted of the control data 11 including the PGCI 64 corresponding to each of the cells 20 with referring to a time code Tt, on the basis of the time code Tt corresponding to the record information R outputted from the VTR 70 and the control information signal Si outputted from the memory 71. Then, the reproduction control information signal Sac is temporarily stored in the hard disk device 74. At this time, although illustrations of the control informations stored in the memory 71 other than the control data 11 are omitted in FIG. 9, they are generated in the signal process unit 72, and are stored in the hard disk device 74, in the same manner as the control data 11.

The above described processes are performed with respect to the whole record information R.

When the above described processes are finished as for the whole record information R, the controller 75 reads out the compressed multiplexed signal Sr from the hard disk device 73, reads out the reproduction control information signal Sac from the hard disk device 74, generates the control information again on the basis of these read out signals, and stores it into the hard disk device 74. This is because there may be a control signal, which content is determined in dependence upon a generation result of the compressed multiplexed signal Sr among various control signals.

On the other hand, the controller 75 performs a time management for each of the operations of the signal process unit 72, the hard disk device 73 and the hard disk device 74, and reads out the reproduction control information signal Sac including the control data 11, from the hard disk device 74, so that the controller 75 generates and outputs an additional information signal Sa corresponding to the read out reproduction control information signal Sac, and generates and outputs an information selection signal Scc to time-axis-multiplex the compressed multiplexed signal Sr and the additional information signal Sa.

After that, the compressed multiplexed signal Sr (which respectively includes the video data 42, the sub picture data 44 and the audio data 43 corresponding to the KARAOKE musics for each stream) and the additional information signal Sa (which includes the reproduction control information signal Sac) are time-axis-multiplexed by the multiplexer 76 to be outputted as an information added compressed multiplexed signal Sap. At the stage of this information added compressed multiplexed signal Sap, the record information R has the physical structure shown in FIG. 1, and the cell identification information 302 is included in the corresponding PGCI 64. Further, the control data 11 including this PGCI 64 is multiplexed such that it is recorded at the inner circumferential side of the recording position on the DVD 1 where the VOB 10 is recorded for each VTS 3.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

According to the above explained recording apparatus S1, the cell identification information 302 to identify the content of each cell 20 is recorded within the PGCI 64. Thus, by specifying the cell 20 having the content to be reproduced (e.g., the male song, the female song or the like) at a time of reproducing the record information R, it is possible to refer to the cell identification information 302 so as to detect and reproduce only the cell 20 having the specified content.

The cell identification information 302 is set in correspondence with the type of the audio information included in the cell 20. Thus, at a time of reproducing the record information R, it is possible to arbitrarily select from the song sung by only the male, the song sung by only the female and the song sung by both the male and the female, to thereby reproduce only any one of these songs.

Moreover, it is possible to select one channel from the KARAOKE song composed of a plurality of channels, to thereby constitute the cell identification information 302 indicative of the content of the cell 20 as for the selected channel. Thus, at a time of reproducing the KARAOKE song, it is possible to reproduce only the specified cell 20 as for only one necessary channel.

Furthermore, in case that the record information R is only for the musical instrument and does not include the song sung by the person, the cell identification information 802 is recorded within the PGCI 64 as the cell identification information to identify the cell 20 divided for each musical instrument.

(III) Embodiment of Reproducing Apparatus

Next, an embodiment of KARAOKE apparatus as an information reproducing apparatus for reproducing the KARAOKE musics recorded on the DVD 1 by the above mentioned recording apparatus S1 will be explained with reference to FIGS. 10 to 12.

In the embodiment described below, it is assumed that: the above mentioned audio information for the KARAOKE is recorded together with the corresponding video information and sub picture information on the DVD 1; and the audio information corresponding to one stream is recorded so as to include the four channels (more concretely, the music information constituted by the accompaniment music to be outputted by the left speaker is recorded on the $1^{st}$ channel, the music information constituted by the accompaniment music to be outputted by the right speaker is recorded on the $2^{nd}$ channel, the guide melody is recorded on the $3^{rd}$ channel, and the vocal itself is recorded on the $4^{th}$ channel. The $4^{th}$ channel has the structure as shown in FIG. 4. Namely, it has such a structure that both of the song for the male and the song for the female are divided for each cell 20 and then are recorded as the same $4^{th}$ channel. Further, as the corresponding cell identification information 302, the cell identification information 302 shown in FIG. 7B is recorded within the PGCI 64.

At first, a construction and an operation of the reproducing apparatus as the embodiment is explained with reference to FIG. 10.

Figure 10:
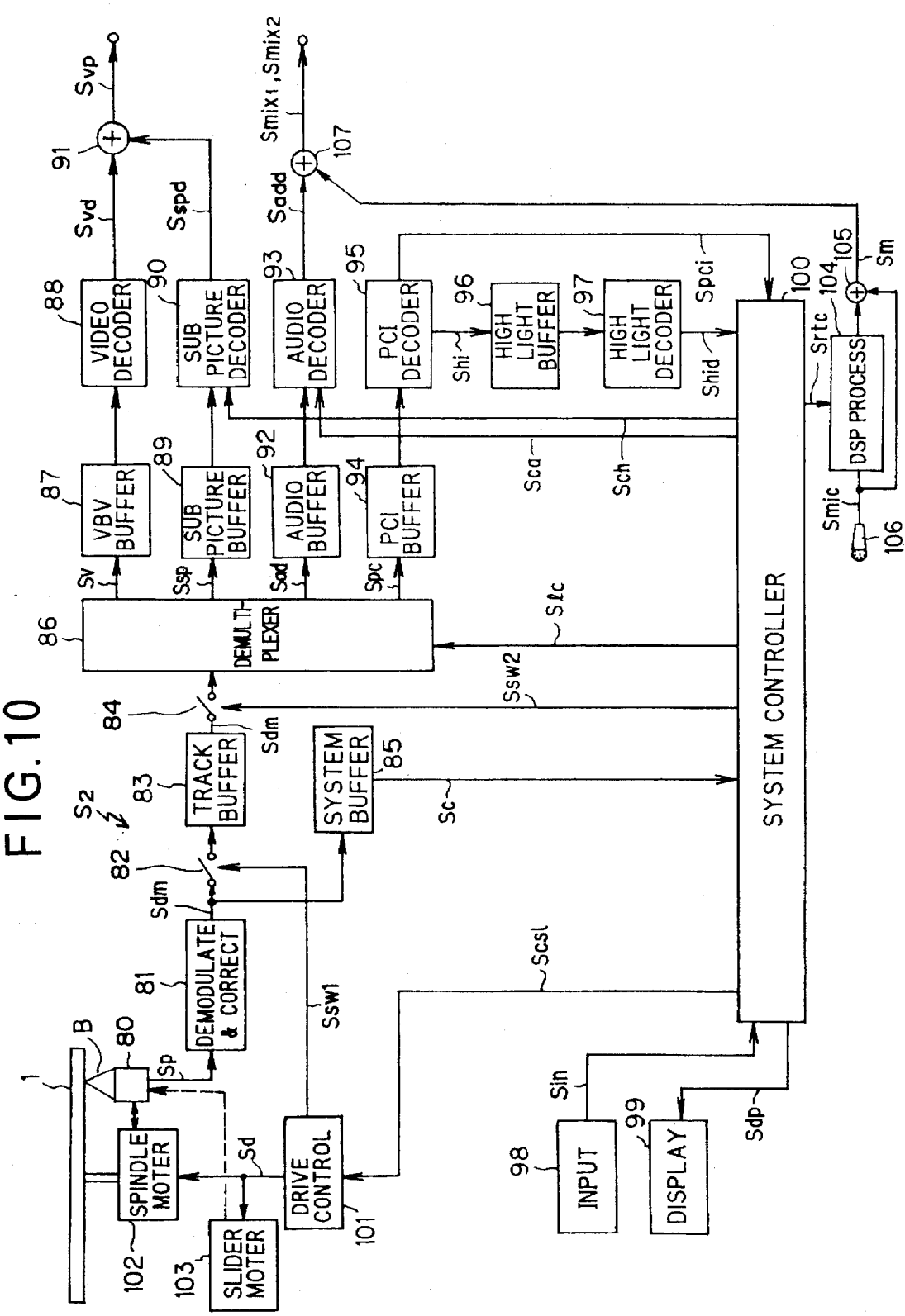
FIG. 10 is a block diagram of a KARAOKE apparatus as another embodiment of the present invention.
Figure 11:
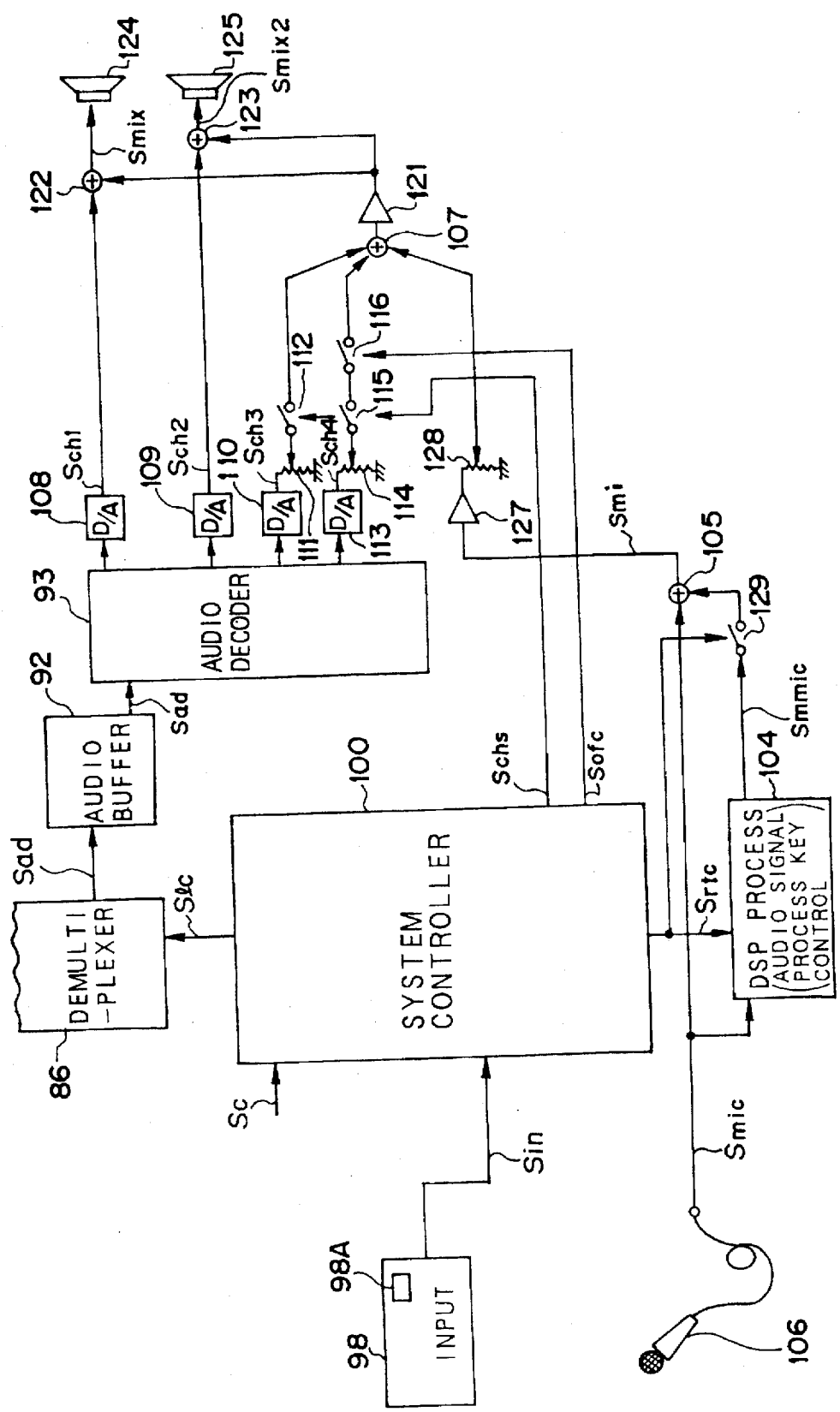
FIG. 11 is a detailed block diagram of a portion related to the reproduction of audio data in the KARAOKE apparatus of FIG. 10.

As shown in FIG. 10, a KARAOKE apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; a slider motor 103; a DSP (Digital Signal Processing) unit 104; mixers 105 and 107; and a microphone 106. The construction shown in FIG. 10 only illustrates the portions related to the video and audio reproduction of the KARAOKE apparatus S2. The description and the detailed explanation as for servo circuits to servo-control the optical pickup 80, the spindle motor 102, the slider motor 103 and the like are omitted since they are constructed in the same manner as the conventional arts.

Especially, a detailed configuration of portions related to the reproduction of the audio data 43 of the KARAOKE song as a feature of the present embodiment, in the whole structure of the KARAOKE apparatus S2 shown in FIG. 10, is explained with reference to FIG. 11. As shown in FIG. 11, the portions contributing to the reproduction of the audio data 48 include the audio decoder 93, D/A (Digital/Analog) converters 108, 109, 110 and 113, volumes 111, 114 and 128, switches 112, 115 and 129, a switch 116 as a switch means, the input unit 98, the system controller 100, the microphone 106, the DSP unit 104, mixers 105, 107, 122 and 123, amplifiers 127 and 121, a left speaker 124 and a right speaker 125.

The input section 98 is provided with a selection key 98A for selecting the voice sound to be reproduced (e.g., the song part for only the male or the song part for only the female).

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal SD outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 88. When it is opened, the demodulation signal Sdm is not outputted therethrough, so that unnecessary or useless information (signal) is not inputted to the track buffer The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective COP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information related to the whole information recorded on the DVD 1 which is detected firstly upon loading the DVD 1, or the additional information such as the control information 11 including the PGCI 64 having the cell identification information 302 (refer to FIG. 7B). Then, the system buffer 85 outputs the accumulated data as one portion of a control information Sc to the system controller 100, and temporarily stores the PSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio information (8 kinds) or the sub picture information (32 kinds). In that case, a desirable language is selected for the audio or sub picture information by a stream selection signal S1c from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91. In the present embodiment, a signal indicating a background image at a time of KARAOKE reproduction is outputted as the decoded video signal Svd.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91. In the present embodiment, a signal indicating a lyric at a time of KARAOKE reproduction is outputted as the decoded sub picture signal Sspd.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated. In the present embodiment, a signal indicating a background image and a lyric at a time of KARAOKE reproduction is outputted as the video signal Svp.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 48 and the sub picture data 44 corresponding to the PCI data 50, and apply the PCI data 50 to the video data 42, the audio data 48 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid.

Further, on the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) Sic, the pause signal Sca and the high light control signal Sch to correctly perform the reproduction corresponding to those input signals, and also outputs a display signal Sdp to display an operation condition etc. of the KARAOKE apparatus S2 to the display unit 99 such as the liquid crystal device.

Furthermore, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scsi is inputted, outputs a drive signal Sd to the spindle motor 102 or the slider motor 108. By this drive signal Sd, the spindle motor 102 or the slider motor 103 moves the optical pickup 80 such that the record position to be reproduced on the DVD 1 is irradiated with the light beam B (refer to an arrow of a broken line in FIG. 10), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Nextly, an operation of the portions of the KARAOKE apparatus S2 related to the reproduction of the audio data 43 as a feature of the present embodiment will be explained with reference to FIGS. 11 and 12.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information.

Further, the information in each of the above mentioned channels (the $1^{st}$ to $4^{th}$ channels) as the audio information is included in the audio signal Sad.

Next, the audio signal Sad, which has been time-adjusted so as to synchronize with the corresponding video information, is outputted to the audio decoder 93. Each of the channels is separated, and a predetermined decoding process is also applied to each of them. Then, each of them is outputted as an accompaniment music (left) signal Sch1 constituting the $1^{st}$ channel, an accompaniment music (right) signal Sch2 constituting the $2^{nd}$ channel, a guide melody signal Sch3 constituting the $3^{rd}$ channel or a vocal channel signal Sch4 constituting the $4^{th}$ channel. As for the guide melody signal Sch3, after a sound volume thereof is controlled by the volume 111, it is outputted to the mixer 107 through the switch 112 controlled on the basis of an output channel selection signal Schs from the system controller 100. As for the vocal channel signal Sch4, after a sound volume thereof is controlled by the volume 114, it is outputted to the mixer 107 through the switch 115 controlled on the basis of the output channel selection signal Schs from the system controller 100 and through the switch 116 controlled on the basis of a real time on/off control signal Sofc from the system controller 100.

At this time, in case of performing the KARAOKE while outputting the guide melody under the operation of the selection key 98A of the input unit 98, the switch 112 is closed and the switch 115 is opened, on the basis of the output channel selection signal Schs. In case of performing the KARAOKE while reproducing the vocal channel under the operation of the selection key 98A of the input unit 98, the switch 115 is closed and the switch 112 is opened, on the basis of the output channel selection signal Schs. Moreover, in case of performing the KARAOKE while reproducing both of the vocal channel and the guide melody, both of the switches 115 and 112 are closed on the basis of the output channel selection signal Schs.

On the other hand, an external voice signal Smic corresponding to an external voice outputted from the microphone 106 is outputted to the mixer 105 as it is, and is also outputted to the DSP unit 104, and DSP-processed on the basis of a real time control signal Srtc from the system controller 100, and is then outputted to the mixer 105 through the switch 129 controlled on the basis of the real time control signal Srtc.

Here, the DSP process in the DSP unit 104 is such a process that, in a case where the input signal Sin to indicate that a male songs the KARAOKE is inputted from the input unit 98 and the external voice signal Smic corresponding to a male voice is inputted from the microphone 106, a so-called key conversion to convert the male voice to the female voice by changing a musical distance thereof (changing only a frequency) is performed on the basis of the real time control signal Srtc from the system controller 100, and this DSP-processed external voice signal Smic is outputted to the mixer 105 through the switch 129 as a converted external voice signal Smmic. On the other hand, in a case where the input signal Sin to indicate that a female songs the KARAOKE is inputted from the input unit 98 and the external voice signal Smic corresponding to a female voice is inputted from the microphone 106, the key conversion to convert the female voice to the male voice by changing a musical distance thereof is performed on the basis of the real time control signal Srtc from the system controller 100, and this DSP-processed external voice signal Smic is outputted to the mixer 105 through the switch 129 as the converted external voice signal Smmic.

Then, the external voice signal Smic and the converted external voice signal Smmic mixed by the mixer 105 are outputted to the mixer 107 through the amplifier 127 and the volume 128 as the mixed signal Smi.

The guide melody signal Sch3 and/or the vocal channel signal Sch4 and the mixed signal Smi including the external voice signal Smic are mixed by the mixer 107, and outputted to the mixers 122 and 123 through the amplifier 121. Then, on one hand, the mixed signal through the amplifier 121 is further mixed with the accompaniment music (left) signal Sch1 by the mixer 122 and outputted to the left speaker 124 as a left mixed audio signal Smix1. On the other hand, the mixed signal through the amplifier 121 is further mixed with the accompaniment music (right) signal Sch2 constituting the second channel by the mixer 123, and outputted to the right speaker 125 as a right mixed audio signal Smix2.

In case of detecting that a temporary interruption (pause) of the audio output is required at the time of reproduction immediately after accessing etc., a pause signal Sca is outputted from the system controller 100 to the audio decoder 93, so that the output of the decoded audio signal Sadd is temporarily stopped by the audio decoder 93.

Next, an operation at the time of reproducing the audio data 43 mainly as for the process of the system controller 100 is explained with reference to FIG. 12, by employing a case as an example where the mixed vocal having the structure shown in the lower stage of FIG. 4 is recorded on the DVD 1 as the $4^{th}$ channel and the male enjoys the KARAOKE while reproducing only the part sung by the female among the $4^{th}$ channel. At a time of reproducing the audio data 43, the real time on/off control signal Sofc and the real time control signal Srtc are outputted by using the cell identification information 302, which is read out from the DVD 1, inputted to the system controller 100 as the control signal Sc and indicated in FIG. 7B, so that the switch 116, the DSP unit 104 and the switch 129 are controlled respectively by these control signals.

Prior to reproducing the KARAOKE, it is selected by the selection key 98A of the input unit 98 that the male enjoys the KARAOKE while reproducing only the part sung by the female among the $4^{th}$ channel. Thus, the switch 112 is opened and the switch 115 is closed by the output channel selection signal Schs on the basis of the input signal Sin. Then, the output of the vocal channel signal Sch4, which is the $4^{th}$ channel is selected.

In FIG. 12, an upper stage of FIG. 12 shows the structure of the audio information for each unit of the cell 20 included in the vocal channel signal Sch4 (refer to the lower stage of FIG. 4). A middle stage of FIG. 12 shows a time band in which the male vocal or the female vocal is reproduced. And, a lower stage of FIG. 12 shows a condition of the operation of the corresponding switch 116 (i.e., the ON/OFF condition by the vocal channel signal Sch4).

When the output of the corresponding video signal Svp is started as well as the reproduction of the KARAOKE, since the vocal is not included in the audio data 43 included in the first cell 20A and cell 20B, the switch 116 is opened on the basis of the real time on/off control signal Sofc from the system controller 100 based on the cell identification information 302 indicative of this fact, and the vocal channel signal Sch4 is not outputted. Simultaneously, the DSP process is not performed by the real time control signal Srtc, while the switch 129 is also opened.

Nextly, when the song part is started and a cell 20C is reproduced, only the male vocal recorded therein is reproduced. However, since the switch 116 is still opened, the male vocal is not reproduced. Then, only the external voice signal Smic based on the external voice sound (i.e., the male voice) inputted from the microphone 106 is outputted, together with the accompaniment music (left) signal Sch1 and the accompaniment music (right) signal Sch2, from the left speaker 124 and the right speaker 125, through the mixers 105 and 107 and the like. Accordingly, the KARAOKE performance of a normal music accompaniment playing is performed.

Then, when a cell 20D constituted by a song for only the female is to be reproduced, the system controller 100 recognizes, from the cell identification information 302, that the audio data 43 recorded on the cell 20D is constituted by the song for only the female, and accordingly the system controller 100 outputs the real time on/off control signal Sofc to thereby make the switch 116 closed. Then, the vocal channel signal Sch4 (including the song for only the female), together with the accompaniment music (left) signal Sch1 and the accompaniment music (right) signal Sch2, is outputted through the mixers 105 and 107 etc. from the left speaker 124 and the right speaker 125. At this timing, the external voice signal Smic based on the external voice (the male voice) inputted through the microphone 106 is also simultaneously outputted from the left speaker 124 and the right speaker 125. Accordingly, the male, who inputs the voice through the microphone 106, can enjoy the duet KARAOKE with the female vocal recorded on the DVD 1.

Next, while cells 20D to 20H are being reproduced, the above mentioned operations are repeated. During this time duration, at a timing when the cells 20 (the cells 20F and 20H) including the song only for the female are reproduced, the switch 116 is closed and thereby the song only for the female is outputted. Then, the duet KARAOKE is performed by the male, who inputs the voice through the microphone 106, and the female vocal recorded on the DVD 1. During this time duration, at a timing when the cells 20 (the cells 20E and 20G) including the song only for the male are reproduced, the switch 116 is opened, and thereby the vocal channel signal Sch4 is not outputted. Thus, only the voice of the male, who inputs the voice through the microphone 106, is outputted together with the accompaniment music.

Next, at a timing when a cell 20I, on which both of the song for the male and the song for the female are recorded, is reproduced, the system controller 100, which recognizes this fact from the cell identification information 302, outputs the real time on/off control signal Sofc to thereby make the switch 116 opened, and then stops the output of the vocal channel signal Sch4. Instead of it, the system controller 100 outputs the real time control signal Srtc so as to start the DSP process in the DSP unit 104 and also make the switch 129 closed. Then, by changing the music distance of the male voice to that of the female voice, the male voice inputted as the external voice signal Smic is converted to the female voice, so that the converted external voice signal Smmic is outputted. Then, the converted external voice signal Smmic is mixed with the external voice signal Smic by the mixer 105, and then outputted through the mixer 107, the amplifier 121 etc., from the left speaker 124 and the right speaker 125 together with the accompaniment music. Therefore, at the timing when the cell 20I in which both of the male song and the female song are recorded is reproduced, the male voice inputted as the external voice signal Smic and the converted external voice signal Smmic which is the female voice to which the male voice is key-converted are mixed and outputted. Thus, the male, who inputs the voice from the microphone 106, can enjoy the pseudo duet KARAOKE with the female.

While the cells 20J to 20Q after the cell 20I are reproduced, the above mentioned operations from the cells 20A to 20H are repeated. At the timing when the cells 20 including the songs only for the female (the cell 20J, the cell 20M and the cell 20P) are reproduced, the switch 116 is closed and thereby the song only for the female is outputted. Then, the duet KARAOKE is played between the male inputting the voice from the microphone 106 and the female vocal recorded on the DVD 1. At the timing when the cells 20 including the songs only for the male (the cell 20L and the cell 20O) are reproduced, the switch 116 is opened and thereby the vocal channel signal Sch4 is not outputted. Then, only the voice of the male inputting the voice from the microphone 106 is outputted together with the accompaniment music. At the cells 20 on which neither the male voice or the female voice is recorded (the cell 20K, the cell 20N and the cell 20Q), the switch 116 is opened and thereby the vocal channel signal Sch4 is not outputted.

By the above mentioned operations, it is possible for the male to enjoy the duet KARAOKE with the female vocal recorded on the DVD 1.

As explained above, according to the KARAOKE apparatus S2 of this embodiment, the cell identification information 302 to identify the content for each cell 20 is recorded within the PGCI 64. Thus, by specifying the cell 20 having the content to be reproduced (e.g. the male song, the female song and the like), it is possible to refer to the cell identification information 302 so as to detect and reproduce only the cell 20 having the specified content.

Since the cell identification information 302 is set so as to correspond to the type of the audio information included in the cell 20, it is possible to arbitrarily select from the song sung by only the male, the song sung by only the female or the song sung by both of the male and the female, to thereby reproduce only desirable one of these songs.

Moreover, the cell identification information 302 indicative of the content of the cell 20 is constituted by selecting one channel from the KARAOKE musics composed of a plurality of channels. Thus, at a time of reproducing the KARAOKE music, it is possible to reproduce only the specified cell 20 as for only one necessary channel.

In the above embodiments of the KARAOKE apparatus S2, the case where the male voice is inputted through the microphone 106 and the male enjoys the duet KARAOKE with the female song recorded on the DVD 1 is explained. However, of course, the present invention can be applied to such a case where the female voice is inputted through the microphone 106 and the female enjoys the duet KARAOKE with the male voice recorded on the DVD 1. In this case, the operations of the switch 116 in the portions other than the play portions only for the musical instrument (the introduction, the ending and the like) are reverse to the case shown in the lower stage of FIG. 4. Namely, the switch 116 is closed at the timings when the cells 20C, 20E, 20G, 20L and 20O are reproduced, and is opened at the timings when other cells 20D, 20F, 20H, 20M and 20P are reproduced. Further, the DSP process in the DSP unit 104 at a timing when the cell 20I is reproduced is also reverse. Thus, the key conversion of key-converting the female voice to the male voice by changing the music distance of the female voice is performed on the basis of the real time control signal Srtc from the system controller.

Moreover, in a case where the record information R is the record information which is only for the musical instrument and does not include the person song, the cell identification information 302 is recorded within the PGCI 64 as the cell identification information so as to identify the cell 20 divided for each musical instrument. Accordingly, it is possible to reproduce the musical instrument which the user wants to reproduce.

In each of the above mentioned embodiments, the case of recording the record information R onto the DVD 1 and reproducing it from the DVD 1 is explained. However, the present invention is not limited thereto, but can be applied to various information recording mediums other than the DVD 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus comprising:
    a signal process means for generating and outputting content information including (i) identification information to identify each of partial record informations constructing whole record information to be recorded onto an information record medium and to indicate content of each of said partial record informations, and (ii) start position information indicating a start position on said information record medium of each of said partial record informations corresponding to said identification information, on the basis of control information inputted from the external to control a reproduction of said record information;

a multiplex means for multiplexing said record information and said content information, to thereby generate and output multiplexed record information; and a record means for recording said multiplexed record information onto said information record medium.

2. An information recording apparatus according to claim 1, wherein:

said record information comprises a plurality of channels to be reproduced at reproduction times same to each other; and said signal process means generates said content information including said identification information comprising information to indicate each of said partial record informations, which constitutes at least one channel of said channels.

3. An information recording apparatus according to claim 1, wherein:

said record information comprises audio information including a song; and said signal process means generates said content information including said identification information comprising information to identify any one of said partial record information corresponding to said song sung only by a male, said partial record information corresponding to said song sung only by a female and said partial record information corresponding to said song sung by both of the male and the female.

4. An information recording apparatus according to claim 1, wherein:

said record information comprises music information, which content is constituted by music of at least one music instrument; and said signal process means generates said content information including said identification information comprising information to identify the kind of music instrument which mainly constitutes content of said music information in each of said partial record informations.

5. An information record medium recorded with record information to be reproduced by an information reproducing apparatus for reproducing said record information on the basis of content information recorded on said information record medium besides said record information, said information record medium comprising a data structure stored in said information record medium and including:

said record information; and said content information including (i) identification information to identify each of partial record informations constructing said record information to be recorded onto an information record medium and to indicate content of each of said partial record informations, and (ii) start position information indicating a start position on said information record medium of each of said partial record informations corresponding to said identification information, on the basis of control information inputted from the external to control a reproduction of said record information, said record information and said content information being multiplexed and recorded as multiplexed record information on said information record medium.

6. An information record medium according to claim 5, wherein:

said record information comprises a plurality of channels to be reproduced at reproduction times same to each other; and said identification information comprises information to indicate each of said partial record informations, which constitutes at least one channel of said channels.

7. An information record medium according to claim 5, wherein:

said record information comprises audio information including a song; and said identification information comprises information to identify any one of said partial record information corresponding to said song sung only by a male, said partial record information corresponding to said song sung only by a female and said partial record information corresponding to said song sung by both of the male and the female.

8. An information record medium according to claim 5, wherein:

said record information comprises music information, which content is constituted by music of at least one music instrument; and said identification information comprises information to identify the kind of music instrument which mainly constitutes content of said music information in each of said partial record informations.

9. An information reproducing apparatus for reproducing record information from an information record medium comprising a data structure stored in said information record medium and including: record information to be reproduced; and content information including (i) identification information to identify each of partial record informations constructing said record information and to indicate content of each of said partial record informations, and (ii) start position information indicating a start position on said information record medium of each of said partial record informations corresponding to said identification information, said record information and said content information being multiplexed and recorded as multiplexed record information on said information record medium, said information reproducing apparatus comprising:

a detection means for detecting said multiplexed record information from said information record medium;

an extract means for extracting said content information from said detected multiplexed record information;

a specification means for outputting a specifying signal to specify the content of one partial record information to be reproduced, among said partial record informations;

a switch means for switching to transmit therethrough or stop thereat an output of said record information to the external after said content information is extracted; and a control means for controlling said switch means to transmit therethrough only said one partial record information having the content specified by said specifying signal to the external, on the basis of said outputted specifying signal and said extracted content information.

10. An information reproducing apparatus according to claim 9, wherein:

said record information comprises a plurality of channels to be reproduced at reproduction times same to each other; and said extract means extracts said content information including said identification information comprising information to indicate each of said partial record informations, which constitutes at least one channel of said channels.

11. An information reproducing apparatus according to claim 9, wherein:

said record information comprises audio information including a song; and said extract means extracts said content information including said identification information comprising information to identify any one of said partial record information corresponding to said song sung only by a male, said partial record information corresponding to said song sung only by a female and said partial record information corresponding to said song sung by both of the male and the female.

12. An information reproducing apparatus according to claim 11, further comprising:

an output means for outputting an external voice signal corresponding to an external voice inputted from the external at a same time of the reproduction of said record information; and a convert and output means for converting said outputted external voice signal in correspondence with said external voice without reproducing partial record information corresponding to a song sung by both of a male and a female, to thereby generate and output a male song and a female song, on the basis of the content specified by said specification means, at a reproduction time when said partial record information corresponding to said song sung by both of said male and said female is reproduced.

13. An information reproducing apparatus according to claim 9, wherein:

said record information comprises music information, which content is constituted by music of at least one music instrument; and said extract means extracts said content information including said identification information comprising information to identify the kind of music instrument which mainly constitutes content of said music information in each of said partial record informations.

* * * * *